UNITED STATES PATENT OFFICE

1,979,600

WATER-INSOLUBLE AZODYESTUFFS

Fritz Ballauf and Albert Schmelzer, Cologne-Mulheim, Germany, assignors to General Aniline Works, Inc., New York, N. Y., a corporation of Delaware No Drawing. Application September 26, 1932, Serial No. 634,982. In Germany October 5, 1931

8 Claims. (Cl. 260—86)

The present invention relates to new water-insoluble azodyestuffs and to fibres dyed therewith, more particularly it relates to dyestuffs which may be represented by the probable general formula:

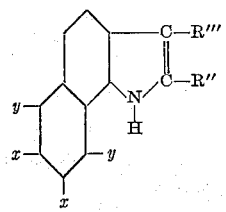

wherein one "y" stands for the group —N=N—R, in which group R stands for the radical of a diazotizable amine suitable for producing an azodyestuff, the other "y" stands for hydrogen, one "x" stands for a hydroxy group in ortho-position to the azo-bridge, the other "x" stands for the group —CO—NH—R', wherein R' stands for a radical of the benzene or naphthalene series, R" stands for a hydrocarbon radical, R''' stands for hydrogen or a hydrocarbon radical or R" and R''' jointly stand for a tetramethylene chain, and wherein all nuclei may be substituted by substituents which do not cause solubility in water or dilute aqueous alkalies; this means that there are excluded from the invention those compounds containing as substituents for example, the sulfonic acid or the carboxylic acid group, while there may be present as substituents for example, alkyl, alkoxy, halogen, the nitro group.

Our new products are obtainable by diazotizing in the usual manner a primary amine suitable for producing an azodyestuff and free from a group inducing solubility in water or dilute aqueous alkalies, such as amino-benzene, amino-naphthalene, amino-carbazole, or their nuclear methyl, ethyl, benzyl, methoxy, ethoxy, nitro or chloro substitution products, and coupling in substance or on the fibre according to the method of producing ice colors with a compound of the general formula:

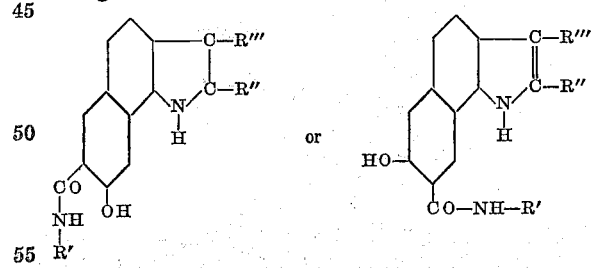

wherein R', R" and R''' mean the same as stated above.

The new dyestuffs are generally dark powders, when produced on the fibre, yielding generally violet to bluish-black shades of good fastness properties.

The coupling compounds used in our invention are obtainable from the corresponding benzindole-hydroxy-o-carboxylic acids and the corresponding amines analogously to the method of preparing arylamides of the 2-hydroxynaphthalene-3-carboxylic acid by condensing the components in an inert solvent, such as chlorobenzene, and with the addition of phosphorus oxychloride as condensing agent.

The benzindole-o-hydroxy-o-carboxylic acids used in the manufacture of the new arylamides are obtainable according to the method described in our pending application for Letters Patent Ser. No. 601,050, filed March 24, 1932, entitled: "Indol compounds."

The invention is illustrated by the following examples, without being limited thereto:

*Example 1.*—Well boiled and dried cotton yarn is impregnated with a solution which has been prepared by dissolving 1.5 g. of 2-phenyl-6,7-benzindol-4'-hydroxy-5'-carboxylic acid-p-anisidide, adding thereto 25 ccs. of caustic soda lye of 34° Bé. and making up to one litre. The yarn is wrung out and, without drying, it is put into a developing bath which has been prepared by diazotizing 2 g. of 1-amino-2-methoxy-4-nitrobenzene, neutralizing the mineral acid with sodium acetate and making up the whole with water to one litre. In this solution the yarn is treated for about 20 minutes, and after rinsing, soaping and drying a beautiful navy blue of good fastness to boiling in water, aqueous soda and to light is obtained. The dyestuff has the following constitution:

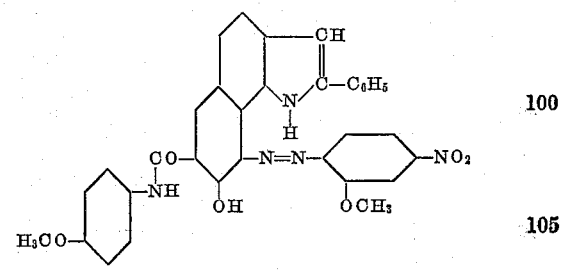

The p-anisidide of the 2-phenyl-6,7-benzindole-4-'-hydroxy-5'-carboxylic acid yields with diazotized 2-amidocarbazole a violet-tinged blue of good fastness properties. The dyestuff corresponds to the following formula:

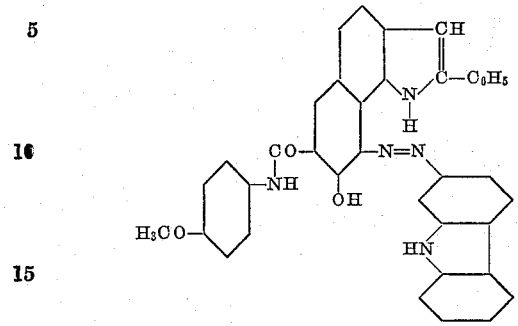

The p-anisidide of the 2,3-dimethyl-6,7-benzindol-4'-hydroxy-5'-carboxylic acid yields with diazotized 1-amino-2-methoxy-4-nitrobenzene a reddish navy blue of good fastness to boiling in water and aqueous soda. The dyestuff corresponds to the following formula:

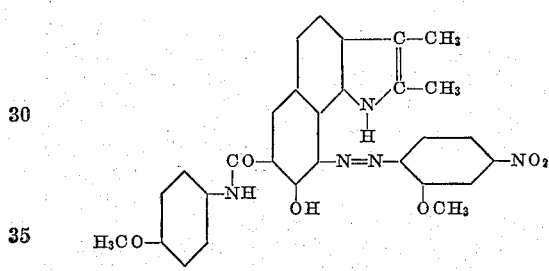

The p-anisidide of the 2-methyl-6,7-benzindol-4'-hydroxy-5'-carboxylic acid yields with diazotized 1 - amino - 2 - methoxy-4-nitrobenzene a bluish violet of good fastness to boiling in water and aqueous soda. The dyestuff has the following formula:

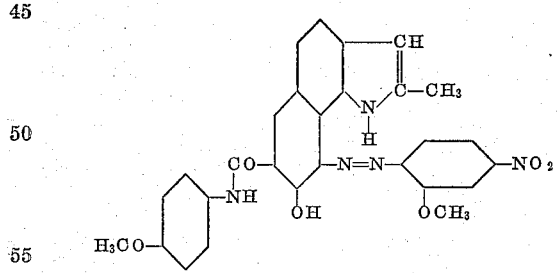

The α-naphthylamide of the 2-methyl-6,7-benzindol-4'-hydroxy-5'-carboxylic acid yields with diazotized 1-amino-2-methoxy-4-nitrobenzene a bluish black of good fastness properties. The dyestuff corresponds to the following formula:

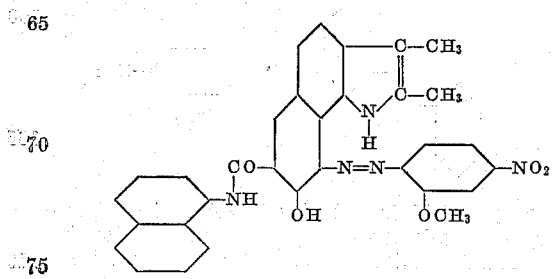

The p-chloranilide of the hydroxy-benzotetrahydrocarbazole carboxylic acid of the formula:

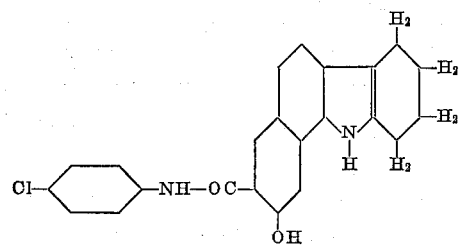

yields with diazotized 1-amino-2-methoxy-4-nitrobenzene a reddish blue of good fastness properties.

The p-anisidide of the same hydroxy-benzotetrahydrocarbazole carboxylic acid yields with diazotized 1-amino-2-methyl-5-chlorobenzene a violet-tinged blue.

The 2 - phenyl - 6,7 - benzindol-4'-hydroxy-5'-carboxylic acid-o-methyl-p-anisidide yields with diazotized 1-amino - 2 - methoxy-4-nitrobenzene blue shades of good fastness properties. The dyestuff corresponds to the following formula:

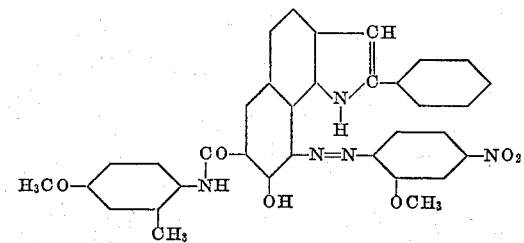

We claim:
1. The dyestuffs of the general formula:

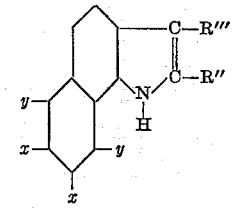

wherein one "y" stands for the group —N=N—R, in which group R stands for the radical of a diazotizable amine suitable for producing an azo-dyestuff, the other "y" stands for hydrogen, one "x" stands for a hydroxy group in ortho-position to the azo-bridge, the other "x" stands for the group —CO—NH—R', wherein R' stands for a radical of the benzene or naphthalene series, R" stands for a hydrocarbon radical, R'" stands for hydrogen or a hydrocarbon radical or R" and R'" jointly stand for a tetramethylene chain, and wherein all nuclei may be substituted by substituents selected from the group consisting of alkyl, alkoxy, halogen, the nitro group, yielding generally when produced on fibre violet to bluish-black shades of good fastness properties.
2. The dyestuffs of the general formula:

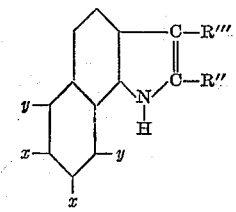

wherein one "y" stands for the group —N=N—R, in which group R stands for the radical of a diazotizable amine suitable for producing an azodyestuff, the other "y" stands for hydrogen, one "x" stands for a hydroxy group in ortho-position to the azo-bridge, the other "x" stands for the group —CO—NH—R', wherein R' stands for a radical of the benzene or naphthalene series, R'' stands for alkyl or a radical of the benzene series, R''' stands for hydrogen or alkyl, or R'' and R''' jointly stand for a tetramethylene chain, and wherein all nuclei may be substituted by substituents selected from the group consisting of alkyl, alkoxy, halogen, the nitro group, yielding generally when produced on the fibre violet to bluish-black shades of good fastness properties.

3. The dyestuffs of the general formula:

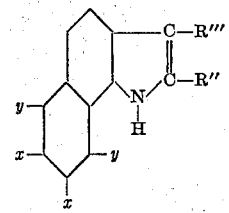

wherein one "y" stands for the group —N=N—R, in which group R stands for a radical of the benzene or naphthalene series, the other "y" stands for hydrogen, one "x" stands for a hydroxy group in ortho-position to the azo-bridge, the other "x" stands for the group —CO—NH—R', wherein R' stands for a radical of the benzene or naphthalene series, R'' stands for alkyl or a radical of the benzene series, R''' stands for hydrogen or alkyl, or R'' and R''' jointly stand for a tetramethylene chain, and wherein all nuclei may be substituted by substituents selected from the group consisting of alkyl, alkoxy, halogen, the nitro group, yielding generally when produced on the fibre violet to bluish-black shades of good fastness properties.

4. The dyestuff of the following formula:

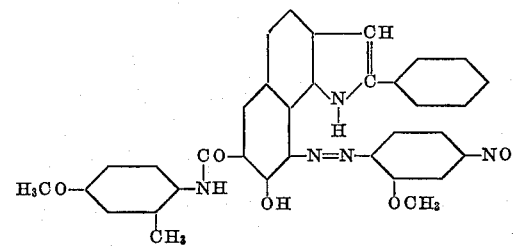

yielding when produced on the fibre blue shades of good fastness properties.

5. Fibres dyed with the dyestuffs as claimed in claim 1.

6. Fibres dyed with the dyestuffs as claimed in claim 2.

7. Fibres dyed with the dyestuffs as claimed in claim 3.

8. Fibres dyed with a dyestuff as claimed in claim 4.

FRITZ BALLAUF.
ALBERT SCHMELZER.